United States Patent [19]
Willacy et al.

[11] Patent Number: 5,953,287
[45] Date of Patent: Sep. 14, 1999

[54] SLUDGE TOPOGRAPHY MEASUREMENT IN OIL TANKS

[75] Inventors: George Arthur Willacy, Flint Mountain; Stanislaw Tadeusz Kolaczkowski, Bath, both of United Kingdom; Nicholas Gaze Pace, Lerici, Italy

[73] Assignee: Willacy Oil Services Limited, Clywyd, United Kingdom

[21] Appl. No.: 08/817,807

[22] PCT Filed: Oct. 18, 1995

[86] PCT No.: PCT/GB95/02462

§ 371 Date: Dec. 15, 1997

§ 102(e) Date: Dec. 15, 1997

[87] PCT Pub. No.: WO96/12202

PCT Pub. Date: Apr. 25, 1996

[30] Foreign Application Priority Data

Oct. 18, 1994 [GB] United Kingdom .................. 9420959

[51] Int. Cl.⁶ .............................. G01S 15/88; G01S 15/89
[52] U.S. Cl. ......................... 367/104; 73/290 V; 73/623
[58] Field of Search .............................. 367/104, 87, 908, 367/910; 73/290 V, 623; 340/621

[56] References Cited

U.S. PATENT DOCUMENTS

| | | |
|---|---|---|
| 4,912,686 | 3/1990 | Craster .................................... 367/104 |
| 5,148,700 | 9/1992 | King ...................................... 73/290 V |
| 5,173,882 | 12/1992 | Watson .................................... 367/104 |

FOREIGN PATENT DOCUMENTS 2107058  4/1983  United Kingdom ................. 73/290 V

*Primary Examiner*—Ian J. Lobo
*Attorney, Agent, or Firm*—David P. Gordon; David S. Jacobson; Thomas A. Gallagher

[57] ABSTRACT

A method of and apparatus for determining the topography and/or volume of a layer of sludge on the bottom of an oil tank, for example, in which a sonar head having a velocimeter is immersed in the oil, and a fan-shaped beam of acoustic energy is swept across the layer of sludge. Also the velocity of sound in the oil is measured, preferably at a plurality of heights over a relatively short vertical range to determine the velocity gradient, which is then extrapolated for the entire depth of the oil. Processing means determine, from the extrapolated velocity gradient, the topography and/or volume of the sludge. The method provides an accurate indication of the distribution and volume of sludge across the whole of the bottom of an oil tank, taking into account changes in the speed and attenuation of acoustic energy due to, for example, the temperature gradient in the oil.

17 Claims, 4 Drawing Sheets

SLUDGE TOPOGRAPHY MEASUREMENT IN OIL TANKS

BACKGROUND OF THE INVENTION

1. Field of the Invention

This invention relates to sludge topography measurement in containers of liquids, particularly in oil tanks.

2. State of the Art

Large oil tanks are used to store crude oil, both when the crude oil is in transit and when it is waiting to be fed to a refinery. The oil storage tanks are typically about 20 meters high and 80 to 100 meters in diameter. Crude oil usually contains significant quantities of water: in order to remove this water, the oil is allowed to settle in the oil storage tank, so that the water falls to the bottom of the tank and can then be drained away. However, as well as water, crude oil also contains some organic materials, in the form of relatively dense waxes which also settle on the bottom of the oil tank, forming a non-uniform deposit of sludge which builds up progressively over time to form a layer which, in some places, can be several meters deep.

The layer of sludge is undesirable for two reasons. Firstly, the sludge can trap pockets of water so that the water cannot be drained away. Secondly, the oil tank usually has a deck or roof which floats on the surface of the oil and has several legs on its underside, but these legs can become lodged in the sludge when the tank is empty: it can then be very difficult to release the floating deck and the deck may be stressed and damaged as the tank is refilled.

In view of these problems, it is necessary for the sludge to be removed periodically. This is achieved by emptying the tank of its oil so that its floating deck rests with its legs on the bottom of the tank: the legs are typically 2 meters long, leaving sufficient space under the deck for personnel to enter and remove the sludge. However, before allowing the floating deck to settle in this manner, it is necessary to determine the depth and distribution of the layer of sludge, in case for example there are high spots on which the deck (or its legs) may come to rest, leaving other parts of the deck unsupported and therefore under stress.

At present, the most widely used method of determining the depth and distribution of the sludge is to simply lower a line, in the manner of a dipstick and from the top of the deck, down hollow collars of the floating deck, in which collars the support legs are normally fixed. The person performing this task is able to sense when the line reaches the surface of the sludge: by repeating the exercise at a large number of the support legs, information as to the depth and distribution of the sludge is derived. However, this method is time-consuming and often inaccurate as there are insufficient support legs to allow enough measurements to be taken to cover the whole area reliably.

Another method which has been proposed involves the use of an infra-red detector which is directed onto the outside of the tank and relies upon a difference in temperature between the sludge and the bulk oil above the sludge. However, this method only provides an indication of the depth of the sludge at the tank wall and does not indicate the distribution of the sludge across the whole of the bottom of the tank, as is required.

SUMMARY OF THE INVENTION

We have now devised a method of, and an apparatus for, determining the topography and/or volume of sludge on the bottom of a container of liquid, particularly oil, which overcome the problems outlined above.

In accordance with this invention, there is provided a method of determining the topography and/or volume of a layer of sludge or other deposit on the bottom of a container of liquid, particularly oil, comprising using an interferometric sonar apparatus, having a transmitter/receiver head immersed in the oil or other liquid above said layer of sludge or other deposit, to survey the surface of said layer of sludge or other deposit.

The sonar transmitter/receiver head may be introduced into the oil in an oil tank by lowering the head through one of the hollow support leg collars of the floating deck or roof of the oil tank, so that the head becomes immersed in the oil. Preferably the head includes a velocimeter for measuring the velocity of sound in the oil. Preferably the sound velocity is measured at a number of different vertical positions of the head (for example over a depth range of several meters), to determine the velocity gradient with vertical position: this velocity gradient may arise due to variations in the temperature of the oil with vertical position. By determining the actual velocity gradient over a relatively short vertical height, this can be extrapolated for the entire depth of the oil, and the processing system can make corrections accordingly.

In the above described case, the sonar head is preferably introduced into the oil at or near the centre of the oil tank, and is rotated to sweep through a full 360° to cover the entire surface of the tank bottom. However, the sonar head may instead be mounted in a fixed position at the wall of the tank: the sonar head should then be recessed into the wall so that it does not obstruct the floating deck as the latter rises and falls past the fixed sonar head. The head may be mechanically fixed but electronically "steered". Preferably two or more such heads are mounted at points spaced apart around the tank, in order to achieve full coverage.

It is well known to use interferometric sonar to provide large area measurements of seabed topography. In principle, sonar operates by transmitting a short pulse of acoustic energy at a specific frequency and receiving the energy which is scattered (or "reflected") by the seabed. The time between transmission of the pulse and reception of the scattered energy indicates the range or distance. Interferometric sonar also provides directional sensitivity such that the bearings of the target may be determined. From the range and bearings, the topography of a surface, such as a seabed, may be mapped.

The present invention is concerned with applying interferometric sonar principles particularly to the measurement of sludge topography in oil tanks. The problems of implementing the interferometric sonar principles for measurement of seabed topography from a ship, such as monitoring the movements of the sonar head, relating measurements to true geographic position, and the effects of tide, are not encountered when applying these principles to measurement of sludge topography in oil tanks. However, despite the simplifications in the nature of the sonar head movements and the absence of tides, there are several practical problems of implementing such a technique in oil. These are primarily due to the properties of oil: both the speed and the attenuation of acoustic energy vary greatly with, for example, the type of oil, the temperature and the temperature gradient. The main effect of a temperature gradient is to cause the path of the sound wave to bend, so that it is not sufficient to determine the angle of arrival of the scattered and returned wave. A further difficulty arises because the acoustic contrast between sludge and oil is slight.

Also in accordance with this invention there is provided an apparatus for determining the topography and/or volume of a layer of sludge or other deposit on the bottom of a container of liquid, particularly oil, the apparatus comprising a sonar head for immersing in the oil or other liquid above the layer of sludge or other deposit, the sonar head comprising means for measuring the velocity of sound in said liquid, means for transmitting acoustic energy, interferometric receiving means for receiving scattered and returned said acoustic energy, and processing means for processing the output of said receiving means and correcting said output in dependence on the measured sound velocity and/or velocity gradient.

Preferably the receiving means of the sonar head comprises a number of spaced receiving transducers which can be selected in different pairs according to the resolution required: in use progressively finer resolutions are employed, as will be described.

Preferably the acoustic energy is transmitted in the form of a fan-shaped beam which is narrow in the horizontal plane and wide in the vertical plane. Preferably means are also provided for rotating the sonar head such that the fan-shaped beam sweeps the area under investigation: alternatively the head may be fixed and electronic "steering" is employed.

Additional constraints will be determined by the size of access ports and the safety requirements necessary in order that the apparatus complies with oil industry regulations. Preferably therefore, the sonar head is hinged along its long dimension such that it can be folded, for passing through a small access hole. The apparatus is preferably provided with flame-proof casings and includes fire-proof electrical equipment.

The method and apparatus according to the present invention are capable of calculating the total volume of sludge on the bottom of the tank or other container.

An embodiment of the invention will now be described by way of example only and with reference to the accompanying drawings.

DETAILED DESCRIPTION OF THE PREFERRED EMBODIMENT

Figure 1:
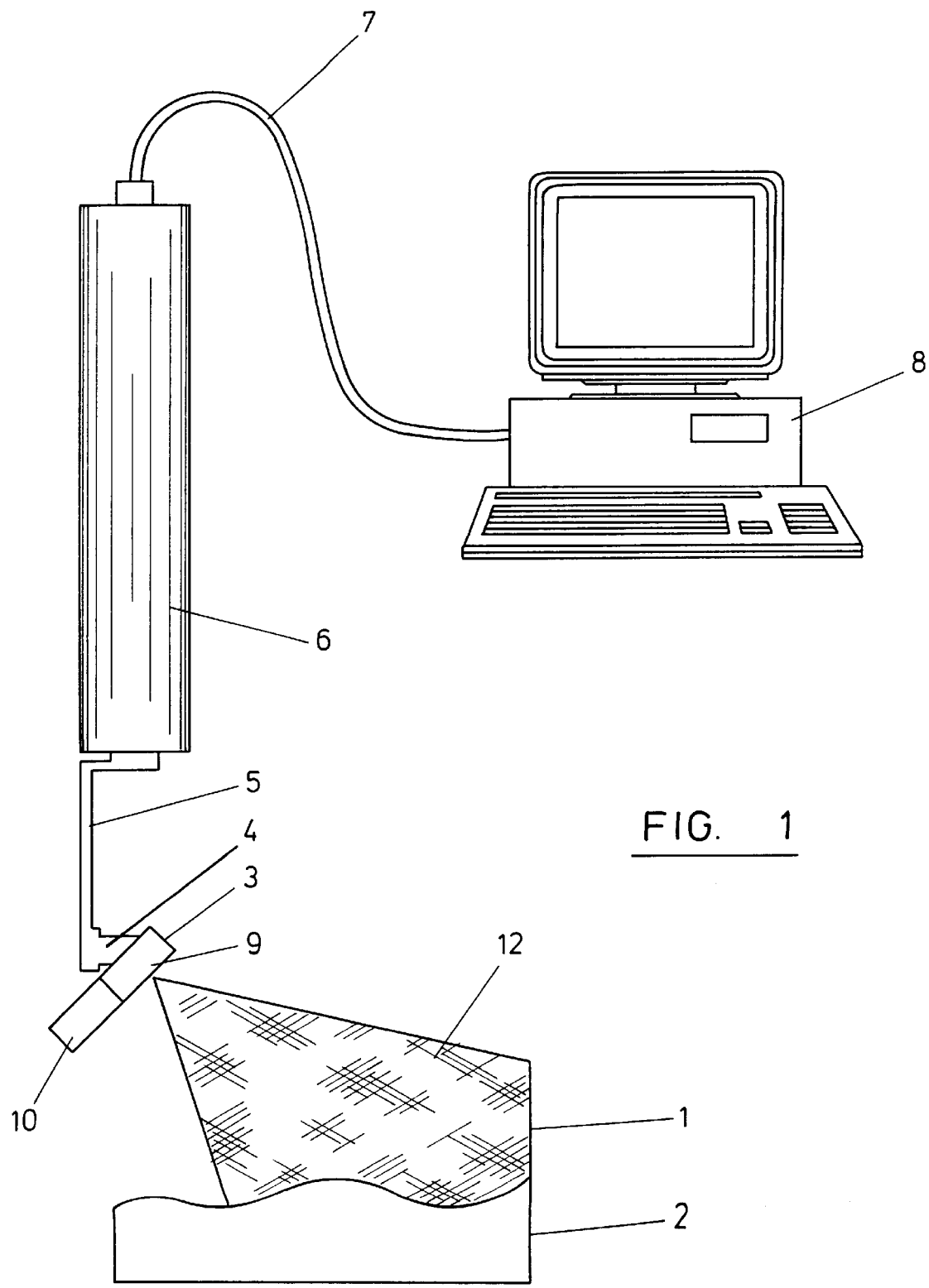
FIG. 1 is a schematic view of an embodiment of apparatus for measuring the topography of sludge in an oil tank according to the present invention.

Referring to FIG. 1, an apparatus for measuring the topography of sludge 2 in an oil tank according to the present invention is shown. The apparatus comprises a sonar head 3 which is coupled to the main control and processing block 6 of the system by means of two connecting sections 4 and 5. The first connecting section 4 is coupled to the sonar head 3 and will allow pivotal movement of the head 3 around a horizontal axis. The second connecting section 5, coupled to the first connecting section 4 as well as to the main control and processing block 6 of the system, allows for orbital scanning movement of the sonar head 3 around a vertical axis. The main control and processing block 6 of the system is connected to a surface computer 8 by means of an interconnecting cable 7.

Figure 2A:
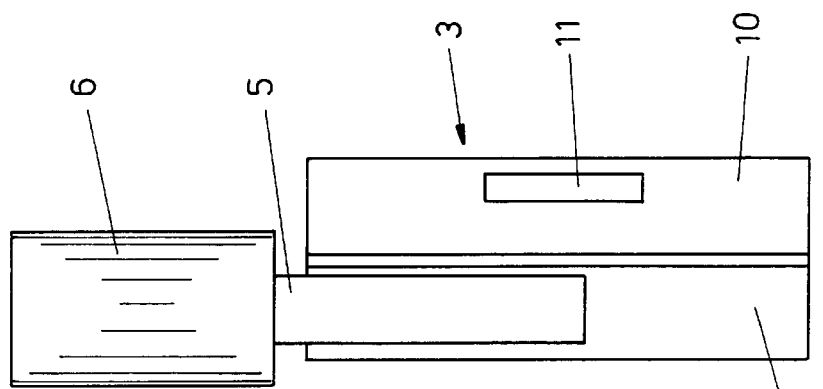
FIG. 2a is a side view of a sonar head of the apparatus, shown when the head is in the closed position.
Figure 2B:
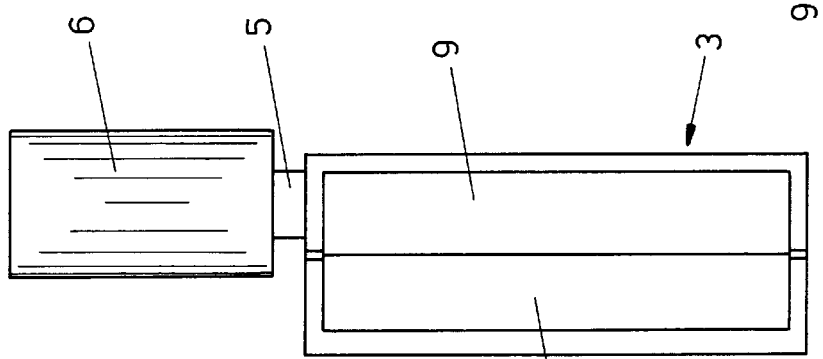
FIG. 2b is a front view of the sonar head, shown when it is in the closed position.
Figure 3A:
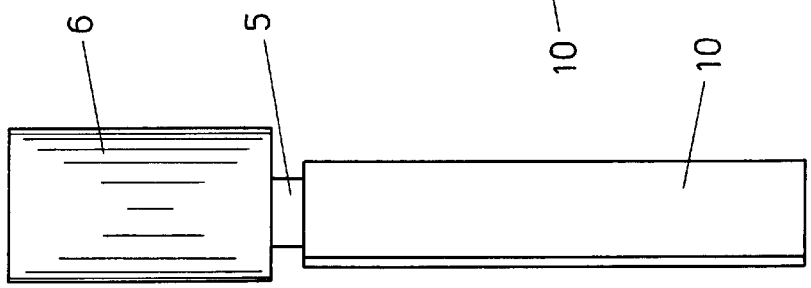
FIG. 3a is a front view of the sonar head, shown when it is in the open position.
Figure 3B:
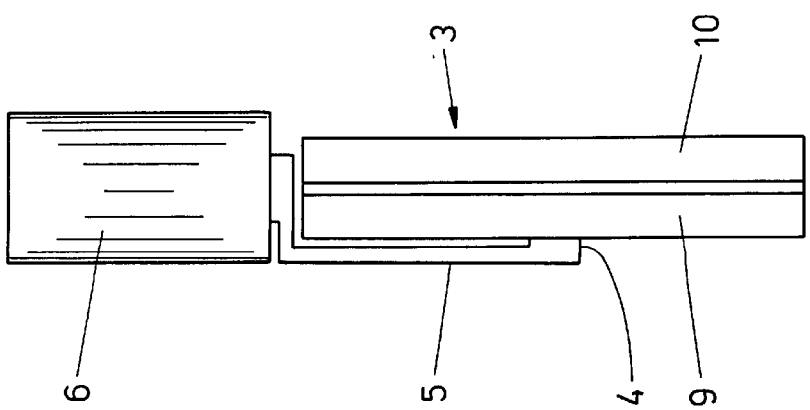
FIG. 3b is a rear view of the sonar head, shown when it is in the open position.

Referring to FIG. 3a, the sonar head 3 comprises a first section 9 and a second section 10, sections 9 and 10 together forming a transmitting and receiving means for transmitting acoustic energy and receiving scattered acoustic energy or echoes. Referring to FIG. 3b, the sonar head 3 further comprises a velocimeter 11 for measuring the velocity of sound in the oil. The sonar head 3 is hinged along its long dimension such that it may be folded into the closed position, as shown in FIGS. 2a and 2b. In its folded condition, the sonar head can be lowered down the hollow collars into which the support legs on the usual floating deck of the oil tank are fixed: these collars have an internal diameter of typically 9 cms.

Referring back to FIG. 1, in use the sonar head 3 is introduced into the oil and then opened by means of, for example, a motor housed within the main control and processing block 6. The head 3 is rotated around the horizontal axis through 90° and then tilted through an angle of between 35° and 55° from the vertical until the sections 9,10 are in the positions shown in FIGS. 1 and 4.

Figure 4:
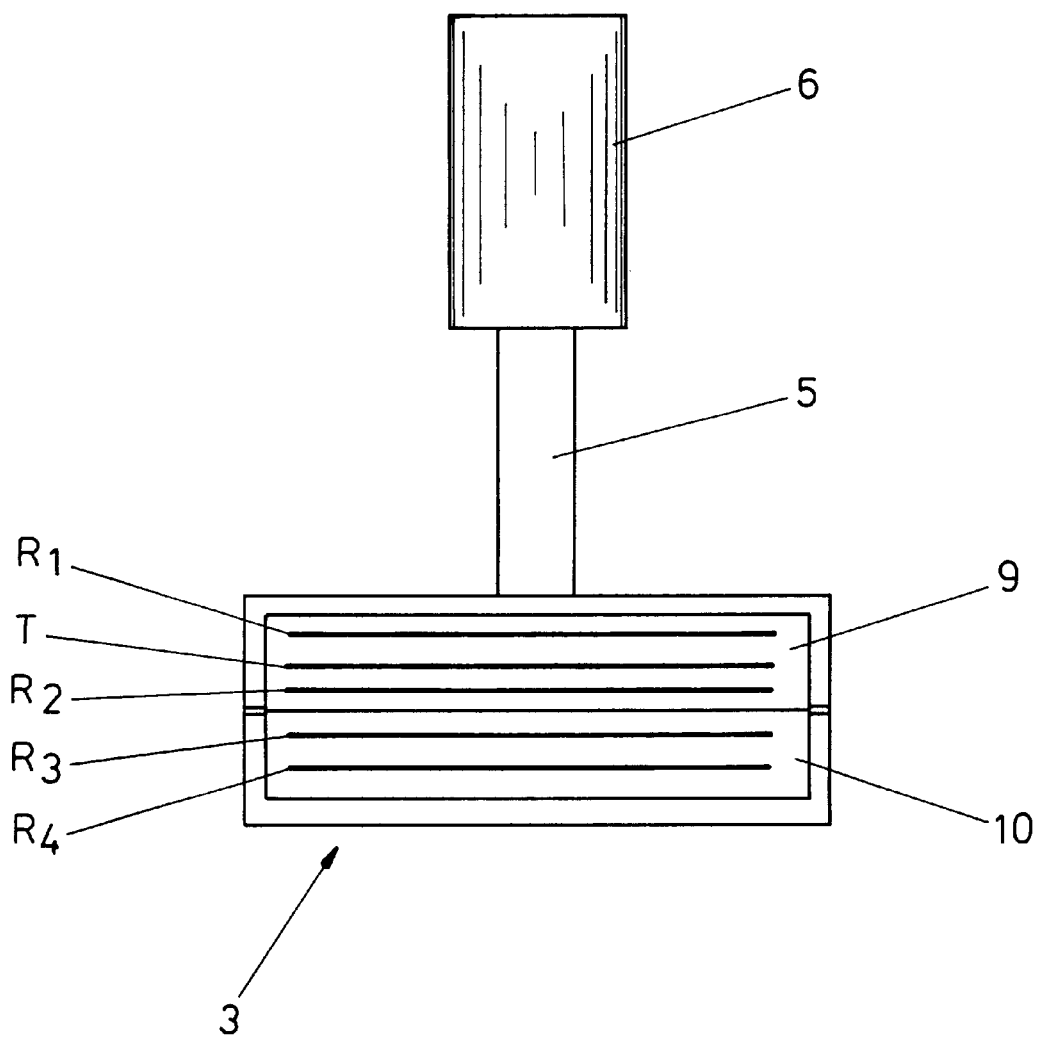
FIG. 4 is a front view of the sonar head, shown when it is in a position to be used.

As shown in FIG. 4, the sonar head includes a transmitting transducer T and four receiving transducers R1–R4, so each transducer (in the example shown) being a rectangular piezoelectric transducer. The transmitter has a long, narrow aperture, and transmits an acoustic beam 12 which is narrow in the horizontal plane and broad in the vertical plane, such that it is in the form of a fan beam. The acoustic beam 12 is directed at the sludge 2 covering the bottom of the oil tank 1. The system is able, by rotation of the connecting section 5 around a vertical axis, to rotate the fan beam 12 through a full 360° to ensure that the sludge surface 2 is fully swept by the fan beam 12. The pulse repetition frequency is adjustable (preferably down to 3 per second or less) in order to avoid reverberations from internal tank features other than the sludge. Since the attenuation in oil is between 10 and 50 times that of seawater at the same frequency, the sonar frequency should be between 100 kHz and 200 kHz, and is preferably 150 kHz, for the interferometric sonar to operate effectively in oil tanks of radius up to 50 meters. The acoustic energy scattered and returned from the sludge 2 is received by the receiving transducers R1–R4. The phase differences between the received signals of the receivers are measured and used to calculate the angle of arrival of the reflected signal: phase can only be measured in the range 0 to 2π and in order to relate the phase difference unambiguously to the angle of arrival, the effective spacing of two receivers must not exceed half a wavelength. However, it is not practical to build receivers at half a wavelength spacing so, for example, the four receivers R1–R4 are spaced at 3.5, 3 and 2 wavelengths apart such that the phase differences for all effective spacings between 0.5 and 8.5 wavelengths in 0.5 wavelength steps can be obtained (assuming a given sound velocity). The larger the spacing, the smaller the errors in relating phase to angle of arrival. Therefore, once the approximate angle of arrival has been determined, a more accurate indication is determined by means of measurements using a larger effective spacing between the receivers.

It follows, therefore, that the relation between measured phase and angle requires the receiver spacing to be known. For seabed applications, the spacings are assumed to be constant at the design value, obtained by assuming a typical sound speed. However when such a system is required to operate in oil, this method is unacceptable and leads to errors due to the fact that sound speed varies significantly with temperature and with the type of oil. Therefore, in order to account for these variations, the velocimeter 11 is included in the sonar head 3: the velocimeter 11 comprises a chamber into which the oil flows, and transmit and receive transducers at opposite ends of the chamber, for measuring the actual time-of-flight and hence determining the actual speed of sound. The outputs of the receiving transducers, both in respect of range and phase differences, are corrected through appropriate software, in accordance with the measured sound velocity and its vertical gradient. Furthermore, if the actual sound velocity is less than the design sound velocity, the relation between phase and angle may again be ambiguous and therefore unacceptable. Therefore, the preferred system requires that the effective half wavelength spacing of the receivers is designed to occur at the lowest sound speed expected. A typical design would be 1300 m/sec, which is about 10% below the sound speed in seawater. In addition to the phase differences between the four receivers, outputs proportional to the signal amplitude are required to aid in the correct interpretation of the phase differences.

As mentioned previously, the sonar head is preferably lowered to different vertical positions and the sound velocity measured at each of these, to determine a velocity gradient which is then extrapolated for the entire tank depth. The processing computer corrects its calculations accordingly for this velocity gradient.

Processing of the echoes from the sludge 2 is performed by the surface computer 8. Processing simulates a pencil beam which extends in a radial direction. Both bathymetric and scatter strength data can be collected simultaneously since the continuous phase and amplitude data in the returning sonar signal is processed.

Figure 5:
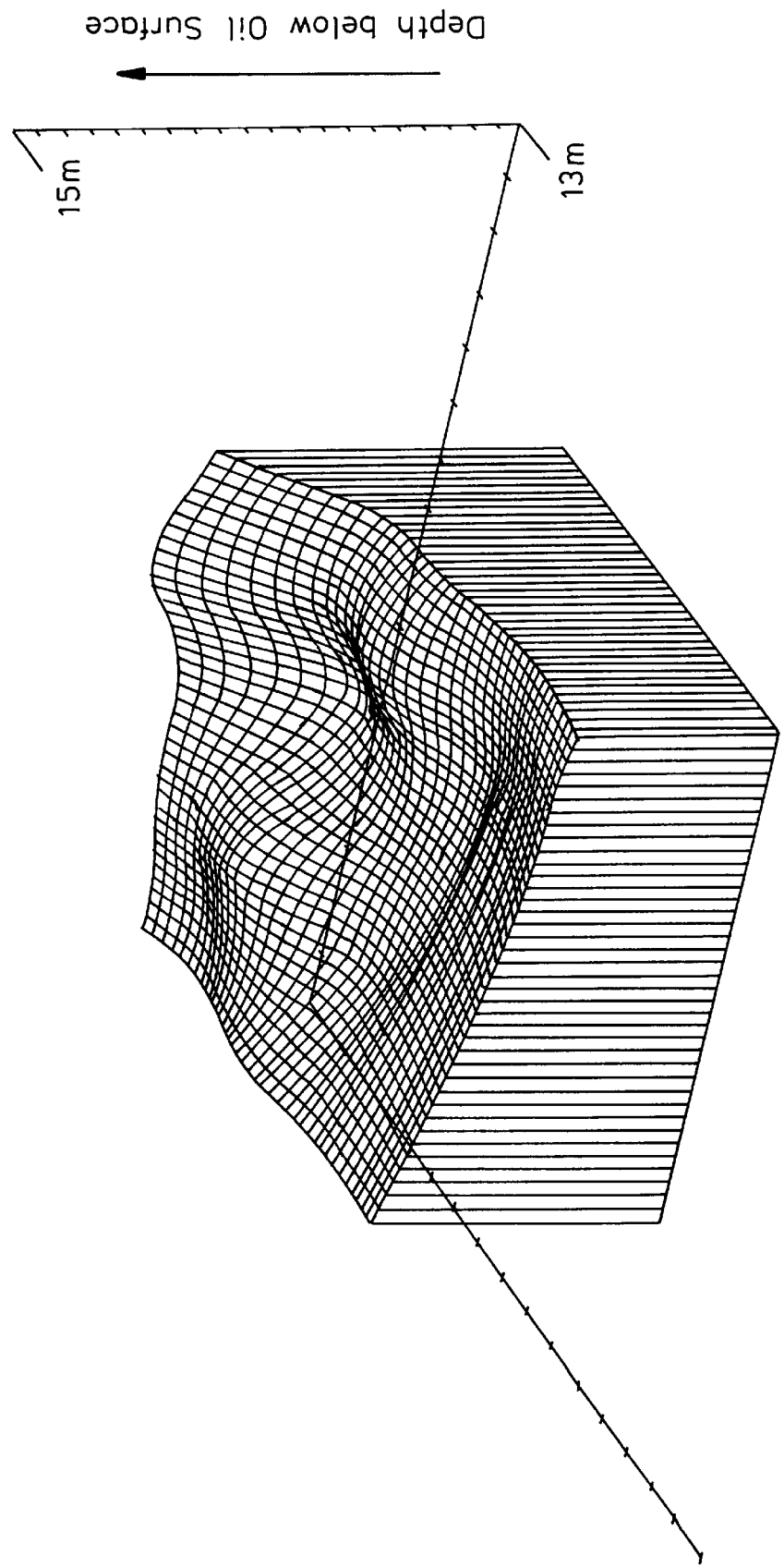
FIG. 5 is an example of sludge topography obtained using the apparatus of the present invention.

When all of the sludge surface has been covered and all of the received signals have been processed, the sludge topography information can be printed out or displayed in any convenient form. For example, the information can be displayed on the surface computer screen in a 3-dimensional oblique view format, as shown in FIG. 5. An important further feature of the system is that it is able to calculate the volume of the sludge, to an accuracy within 10%.

The system of the present invention preferably has a flameproof casing for the individual components of the apparatus, as well as flameproof electrical equipment, in order to comply with oil industry regulations and so enable its use in potentially explosive environments.

The apparatus which has been described has a sonar head which is rotated mechanically to sweep the required area. Instead the sonar head may be fixed but electronically steered: in this case for example, each of the transducers T and R1–R4 comprises a linear array of (say 50) piezoelectric elements which are separately accessible to the electronic control circuitry to enable the required sweeping action.

It will be appreciated that the invention need not be limited to sludge topography measurement in crude oil tanks, but may be extended to operate in a similar manner for sediment topography measurement in any type of liquid storage container.

We claim:

1. A method of surveying a layer of sludge or other deposit on the bottom of a container of oil, the container being closed by one of a floating deck and a roof, the method comprising:

a) using an interferometric sonar apparatus which includes an elongate transmitter/receiver head;

b) lowering said elongate head in a vertical orientation, through a small opening in the floating deck or roof of the container until said head is immersed in oil;

c) after said lowering turning said elongate head toward a horizontal orientation; and d) using said turned head when immersed in the oil above the layer of sludge or other deposit to survey the surface of said layer of sludge or other deposit.

2. A method according to claim 1, in which the elongate transmitter/receiver comprises two parts which are hinged together along a longitudinal line of the head, wherein:

said lowering comprises lowering said head into the container with its two parts folded together, and said method further comprises unfolding said two parts of said head.

3. A method according to claim 1, wherein the transmitter/receiver head comprises a velocimeter, and said method further comprises:

measuring the velocity of sound in the oil at a plurality of different vertical positions of said head in order to determine the velocity gradient with vertical position.

4. A method according to claim 3, further comprising:

determining the velocity gradient over a relatively short vertical height and then extrapolating for the entire depth of the oil.

5. A method according to claim 1, further comprising:

introducing the transmitter/receiver head into the oil at or near the center of the container, and rotating the transmitter/receiver head to sweep through 360° to scan the entire surface of the bottom of the container.

6. An apparatus for surveying sludge or other deposit on the bottom of a container of oil, the apparatus comprising:

a) an elongate sonar head positionable in a vertical orientation for lowering into the oil above, the layer of sludge or other deposit; and b) means for turning said sonar head toward a horizontal orientation, wherein, said sonar head includes means for transmitting acoustic energy, interferometric receiving means for receiving scattered and returned said acoustic energy, and processing means for processing the output of said receiving means and correcting said output in dependence on at least one of a sound velocity and a velocity gradient.

7. An apparatus according to claim 6, wherein:

said elongate sonar head comprises two parts which are hinged together along a longitudinal line of said head so that said two parts can be folded together for lowering into the container, and said apparatus further comprises means for unfolding said two parts.

8. An apparatus according to claim 6, wherein:

said receiving means of said sonar head comprises a plurality of receiving transducers positioned at successively different spacings, and said apparatus includes means for selecting different pairs of said receiving transducers according to a required resolution.

9. An apparatus according to claim 6, wherein:

said means for transmitting is arranged to transmit the acoustic energy in the form of a fan-shaped beam which is narrow in a horizontal plane and wide in a vertical plane.

10. An apparatus according to claim 8, further comprising:

means for rotating said sonar head such that the fan-shaped beam sweeps an area under investigation.

11. An apparatus according to claim 10, wherein:
said sonar head is fixed, and said apparatus further comprises electronic means for steering said head such that the fan-shaped beam sweeps at least a portion of the area under investigation.

12. An apparatus according to claim 6, further comprising:
said sonar head includes means for measuring the velocity of sound in said liquid.

13. An apparatus according to claim 12, wherein:
said means for measuring the velocity of sound comprises a chamber into which said liquid flows, and transmit and receive transducers spaced apart in said chamber.

14. An apparatus according to claim 6, wherein:
said means for transmitting acoustic energy comprises sonar means for transmitting a frequency of between 100 kHz and 200 kHz.

15. An apparatus according to claim 6, wherein:
said means for transmitting acoustic energy comprises means for transmitting at a pulse repetition frequency adjustable down to about three pulses per second.

16. A method of surveying a layer of sludge or other deposit on the bottom of a container of oil, the method comprising:
a) using an interferometric sonar apparatus which includes a transmitter/receiver head having means for transmitting acoustic energy and a plurality of receiving transducers positioned at successively different spacing; and
b) immersing said transmitter/receiver head in said oil above said layer of sludge or other deposit; and
c) surveying the surface of said layer of sludge or other deposit by selecting and activating different pairs of said receiving transducers according to the required resolution, in order to analyze the acoustic energy returned to the head.

17. An apparatus for surveying sludge or other deposit on the bottom of a container of oil, the apparatus comprising:
a sonar head arranged for being immersed in the oil above the layer of sludge or other deposit, said sonar head comprising means for measuring the velocity of sound in said liquid, means for transmitting acoustic energy, interferometric receiving means for receiving acoustic energy which is scattered and returned to said head, and processing means for processing an output of said receiving means and correcting said output in dependence on at least one of a measured sound velocity and a velocity gradient, said receiving means of said sonar head comprising a plurality of receiving transducers positioned at successively different spacings, and said apparatus including means for selecting different pairs of said receiving transducers according to a required resolution.

* * * * *